United States Patent

Palyo, III et al.

[11] Patent Number: 6,062,777
[45] Date of Patent: May 16, 2000

[54] MACHINING THREADED TUBULAR GOODS

[75] Inventors: George John Palyo, III, Houston, Tex.; William Boyd Sargent, Birmingham, Ala.

[73] Assignee: USX Corporation, Pittsburgh, Pa.

[21] Appl. No.: 09/232,943

[22] Filed: Jan. 19, 1999

[51] Int. Cl.⁷ .................................................. B23G 5/00
[52] U.S. Cl. ........................ 408/1 R; 408/217; 408/221; 470/185
[58] Field of Search ............... 408/1 R, 22, 23, 408/25, 117, 24, 118, 217, 221, 216, 223; 470/70, 80, 81, 185, 187; 82/110, 113

[56] References Cited

U.S. PATENT DOCUMENTS

| | | | |
|---|---|---|---|
| 828,808 | 8/1906 | Borden. | |
| 861,682 | 7/1907 | Shaw. | |
| 1,076,188 | 10/1913 | Borden. | |
| 1,418,323 | 6/1922 | Nonneman. | |
| 1,459,240 | 6/1923 | Nonneman. | |
| 1,616,542 | 2/1927 | Nonneman | 470/185 |
| 1,647,037 | 10/1927 | Duchesne. | |
| 1,817,018 | 8/1931 | Roberts | 470/185 |
| 1,936,696 | 11/1933 | Thomson | 408/221 |
| 1,950,704 | 1/1934 | Thomson | 408/217 |
| 2,041,027 | 5/1936 | Sintz | 408/221 |
| 2,267,506 | 12/1941 | Olsen | 10/120.5 |
| 2,556,742 | 6/1951 | Strickland | 10/95 |
| 3,082,446 | 3/1963 | Benninghoff | 10/120.5 |
| 3,629,887 | 12/1971 | Urbanic | 10/120 |
| 3,645,638 | 2/1972 | Theuerkauf | 408/1 |
| 3,776,655 | 12/1973 | Urbanic | 408/1 |
| 3,812,548 | 5/1974 | Theuerkauf | 10/120.5 R |
| 4,068,977 | 1/1978 | Rossetti | 408/177 |
| 4,117,563 | 10/1978 | Fredd | 10/101 R |
| 4,824,297 | 4/1989 | Jordan et al. | 408/221 |
| 5,002,440 | 3/1991 | Tamaoki et al. | 408/12 |

FOREIGN PATENT DOCUMENTS 123658  3/1947  Australia ............................. 470/185

*Primary Examiner*—Daniel W. Howell
*Attorney, Agent, or Firm*—William F. Riesmeyer, III

[57] ABSTRACT

A method is provided for machining threads on cylindrical parts, particularly oil country tubular goods, by mounting four thread-cutting chasers in a die head of a thread cutting machine. The thread chasers are each of unique profile, which enables the cutting of threads to close tolerance and decreases metal burrs on the first and last threads cut on the part by reducing the total tool cutting forces imposed on the part and said threading machine.

2 Claims, 2 Drawing Sheets

MACHINING THREADED TUBULAR GOODS

TECHNICAL FIELD

This invention relates to the machining of threaded tubular goods, and particularly to the machining of threaded tubular goods using four chasers each of unique profile in order to obtain more precise machining of the threads by reducing the total tool cutting forces imposed on the part and said threading machine.

BACKGROUND ART

In the machining of oil country tubular goods a large dedicated threading machine is normally used to form threads for pipe and connectors. The dedicated machine usually comprises a die head with three tool blocks spaced one hundred twenty degrees apart for holding turning tools that remove excess metal stock from the part prior to the cutting of threads. The die head additionally comprises three tool blocks spaced intermediate the turning tool blocks for holding three unique thread-cutting chasers. This machine can produce a threaded end at extremely high speeds utilizing a single machine pass operation. However, dedicated threading machines of this type usually cannot be used to produce threads that require close tolerances and enhanced surface finish. In order to meet the demands of the industry for critical applications set forth by the American Petroleum Institute with regard to tighter thread tolerances on 8-round and buttress connections the use of slower computer numerial controlled (CNC) machines has been required. The CNC machine utilizes a single carbide insert and multiple machine passes to produce these threaded parts. These multiple pass methods enhance thread quality by lowering the machine cutting forces imposed on the machine and the part. Even with the use of CNC machines thread burrs on the starting and ending threads are common and must be removed with additional carbide cutting steps or in most cases must be removed by hand dressing.

U.S. Pat. No. 3,082,446 discloses a die head for a rotary spindle thread cutting machine employing three high-speed carbide thread-cutting chasers for cutting tapered threads. U.S. Pat. No. 3,812,548 shows a similar rotary spindle thread cutting machine with a die head having three thread cutting chasers. U.S. Pat. Nos. 3,776,655 and 3,629,887 both disclose a set of three multitooth chasers arranged to perform a succession of central roughing cuts and one finish cut both having chip segments of approximately trapezoidal cross sections. The three chasers are each of unique profile and are said to be free from any portions that can cause flanking cuts that result in lateral flanges on the resultant chips. A die head for a rotary spindle machine is shown with positions for three chasers for cutting the threads.

U.S. Pat. No. 3,645,638 describes a series of substantially identical individual single tooth thread cutting tools that are rotated concurrently about the axis of a pipe and applied in cutting relation in succession at the same starting point by movement radially in a time delay relation to each other. The cutting tools are retracted from the pipe in succession in the same order in which they were engaged with the pipe in the same time delay relation to each other. A die head with eight identical cutting tools is shown.

U.S. Pat. No. 2,267,506 discloses a diestock for cutting threads on pipe with four multitooth chasers spaced ninety degrees from each other. U.S. Pat. No. 2,556,742 also discloses a die head with four thread chasers arranged at spaced locations circumferentially arranged ninety degrees from each other. Neither of these references teach or suggest that the chasers may each be of unique profile.

Other references of interest are U.S. Pat. Nos. 5,002,440; 4,117,563; 1,647,037; 1,459,240; 1,418,323; 1,076,188; 861,682; and 828,808.

DISCLOSURE OF INVENTION

The present invention is of a method of cutting threads on tubular goods utilizing four chasers each of unique profile. The chasers are mounted in blocks on a die head of a rotary spindle thread cutting machine. The blocks may be equally spaced circumferentially in the die head. In another embodiment the invention is of a method for cutting threads using a threading machine having a die head comprising six blocks. A first set of three blocks are equally spaced circumferentially one hundred and twenty degrees from each other. A second set of three blocks are located intermediate the blocks of the first set and spaced one hundred and twenty degrees from each other. The method includes mounting four chasers each having a unique profile in the blocks of the first set and one of the blocks of the second set. Turning tools are mounted in the remaining blocks of the second set and advanced to remove excess metal from the cylindrical part. The chasers are radially advanced to cut threads in the part. Preferably the chasers are advanced uniformly. The method decreases metal burrs on the first and last portions of threads being applied to the part by reducing the total tool cutting forces imposed on the part and the threading machine.

MODES FOR CARRYING OUT THE INVENTION

Figure 1:
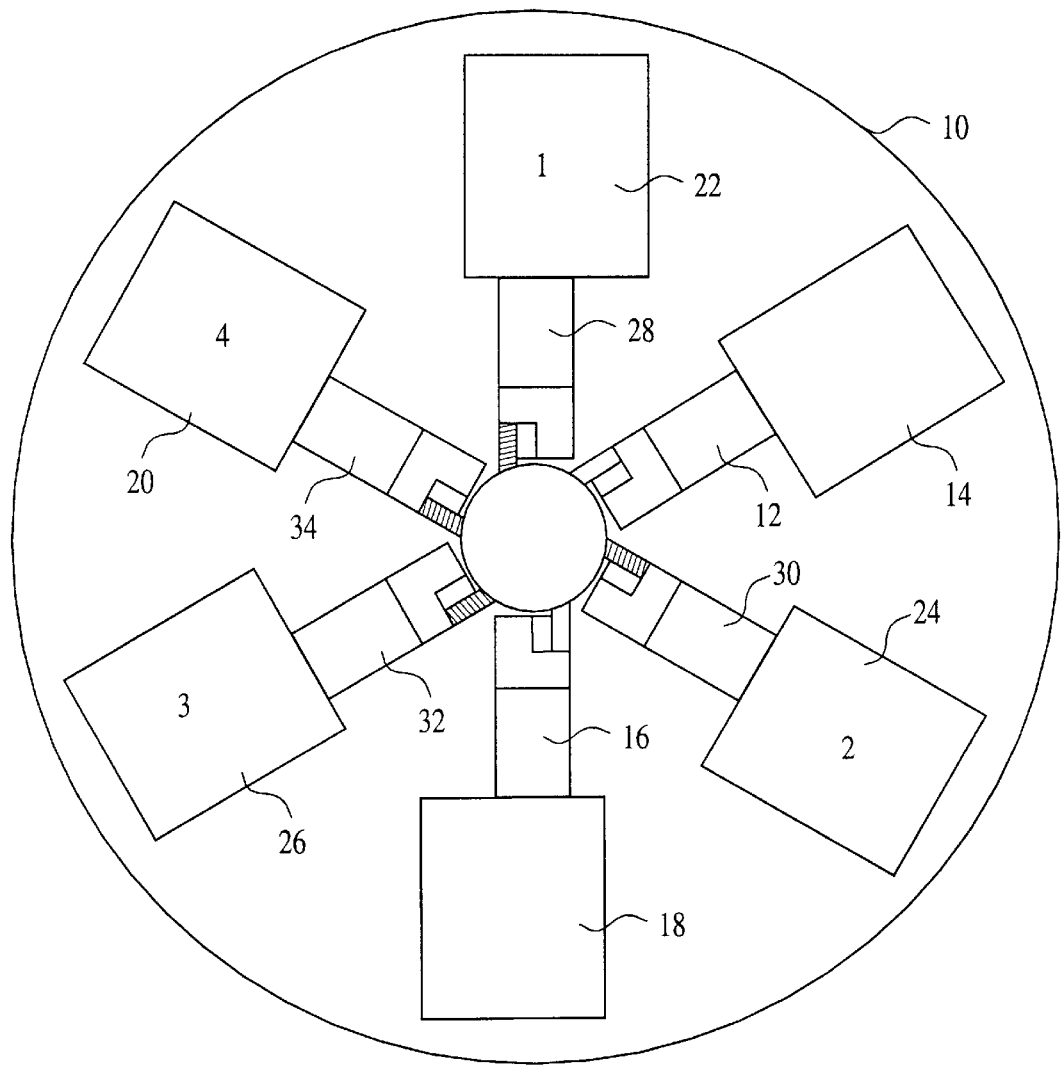
FIG. 1 is a schematic representation of a front view of a die head of a dedicated threading machine having six circumferentially spaced blocks, with turning tools mounted in two of the blocks and thread chasers mounted in four of the blocks according to the method of this invention.
Figure 2A:
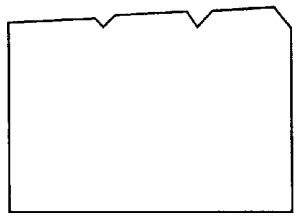
FIGS. 2A, 2B, 2C and 2D are side views of each of the four thread chasers of the present invention showing the unique thread profile of each chaser.
Figure 2B:
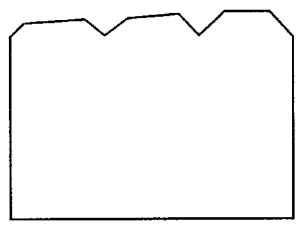
Figure 2C:
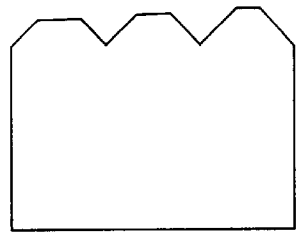
Figure 2D:
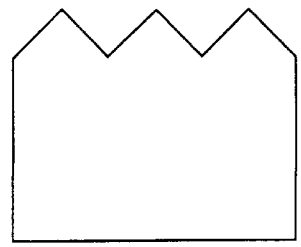

Rotary spindle threading machines are well known. Typical rotary spindle thread cutting machines are illustrated in U.S. Pat. Nos. 3,082,446 and 3,812,548, the specifications of which are incorporated herein by reference. Referring to FIG. 1 a die head 10 for a rotary spindle threading machine (not shown) has a first turning tool 12 mounted in block 14 and a second turning tool 16 mounted in block 18 of the die head. Turning tools 12 and 16 are adapted to remove excess metal from a cylindrical part, such as a pipe or a tubular connector, in preparation for the threading process. In the prior art of threading with this type of machine a third turning tool is normally mounted in block 20 of the die head and three thread chasers are mounted in blocks a first set of blocks 22, 24, and 26.

According to the present invention, thread chasers 28, 30, and 32 are mounted in the first set of blocks 22, 24 and 26, respectively, and a fourth thread chaser 34 is mounted in block 20 of a second set of blocks 14, 18 and 20, instead of a turning tool. Referring to FIGS. 2A through 2D, each chaser has a unique profile. The profile of each chaser is designed to progressively make cuts of increasing width and depth in the part until the fourth chaser completes the final thread profile. The chasers are designed to form the threads, preferably with a single pass operation on the rotary spindle-threading machine. Heretofore, it has not been possible to form threads using four chasers of unique profile because the tolerances required for the cutting teeth of four chaser sets, as distinguished from three chaser sets, are so small. However, we have found that a fourth chaser can be used on a three chaser dedicated threading machine which, by reducing the total tool cutting forces imposed on the part and said threading machine, will provide threads of higher quality than were previously attainable. Indeed metal burrs on the first and last portion of threads formed on the part being machined are significantly reduced. Also threads of closer tolerance can be made using four chasers in a dedicated machine as compared to threads made using three chasers in those machines.

What is claimed is:

1. A method for threading a cylindrical part on a rotary spindle threading machine having a die head with at least six circumferentially spaced blocks therein, a first set of three blocks equally spaced circumferentially and a second set of three blocks located intermediate the blocks in the first set, the blocks in said second set being equally spaced circumferentially from each other, said method comprising:

providing a set of four thread chasers each having a unique profile on a cutting edge thereof for progressively forming threads on said cylindrical part, mounting three of the four thread chasers in the first set of blocks and the remaining chaser in one of the blocks of the second set, mounting turning tools in the remaining two blocks of the die head, advancing the turning tools to remove excess metal from the cylindrical part while the die head of the rotary spindle machine is rotated, and radially advancing said chasers to perform a thread cutting operation on the cylindrical part while the die head of the rotary spindle machine is rotated, whereby metal burrs on the first and last portion of threads cut on said part are significantly decreased by reducing the total tool cutting forces imposed on the part and said threading machine.

2. The method of claim 1 wherein the four chasers are advanced uniformly to cut threads in the part.

* * * * *